US012739790B2

(12) United States Patent
Hong et al.

(10) Patent No.: US 12,739,790 B2
(45) Date of Patent: Sep. 15, 2026

(54) METHOD AND APPARATUS FOR PAGING REJECTION RESPONSE, AND COMMUNICATION DEVICE

(71) Applicant: BEIJING XIAOMI MOBILE SOFTWARE CO., LTD., Beijing (CN)

(72) Inventors: Wei Hong, Beijing (CN); Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 401 days.

(21) Appl. No.: 18/289,109

(22) PCT Filed: May 6, 2021

(86) PCT No.: PCT/CN2021/091966
§ 371 (c)(1),
(2) Date: Oct. 31, 2023

(87) PCT Pub. No.: WO2022/233007
PCT Pub. Date: Nov. 10, 2022

(65) Prior Publication Data
US 2024/0224229 A1 Jul. 4, 2024

(51) Int. Cl.
*H04W 68/02* (2009.01)
*H04W 76/27* (2018.01)
*H04W 88/06* (2009.01)

(52) U.S. Cl.
CPC .......... *H04W 68/02* (2013.01); *H04W 76/27* (2018.02); *H04W 88/06* (2013.01)

(58) Field of Classification Search
CPC ...... H04W 68/02; H04W 76/27; H04W 88/06
See application file for complete search history.

(56) References Cited

U.S. PATENT DOCUMENTS 11,641,638 B2 * 5/2023 Li .......................... H04W 64/00 455/456.3

FOREIGN PATENT DOCUMENTS

| | | |
|---|---|---|
| CN | 110234131 A | 9/2019 |
| CN | 111278106 A | 6/2020 |
| WO | WO 2021066562 A1 | 4/2021 |

OTHER PUBLICATIONS

Chinese Patent Application No. 202180001106.1 Office Action dated Mar. 27, 2025, with English translation, 18 pages.
Nokia et al., "Solution for improved paging in MUSIM devices (KI#1,2,3)", SA WG2 Meeting #136-AH, S2-2000855, Jan. 2020, 7 pages.
PCT/CN2021/091966 International Search Report dated Feb. 9, 2022, 2 pages.
Sony: "Solution: Busy Indication as a paging response", SA WG2 Meeting #135, 3GPP Draft; S2-1909466, Oct. 2019, 5 pages.
European Patent Application No. 21939655.3, Search and Opinion dated Jun. 3, 2024, 13 pages.

(Continued)

*Primary Examiner* — Lester G Kincaid
(74) *Attorney, Agent, or Firm* — Cozen O'Connor

(57) ABSTRACT

A method for rejection of responding to a paging message. The method includes: receiving a paging message sent by an access network device, and sending a service request message to the access network device, the service request message including a paging reject response identifier.

19 Claims, 5 Drawing Sheets

(56) References Cited

OTHER PUBLICATIONS

Vivo "E-mail discussion:[Post111-e][917][Multi-SIM]Multi-Sim(vivo)" 3GPP TSG-RAN WG2 Meeting #112e, R2-2009325, Nov. 2020, 74 pages.
Sony "Solution KI#1:Busy Indication as a paging response" SA WG2 Meeting #136, 3GPP Draft, S2-1911141, Nov. 2019, 4 pages.
Chinese Patent Application No. 202180001106.1, Office Action with English translation dated Aug. 12, 2025, 19 pages.

* cited by examiner

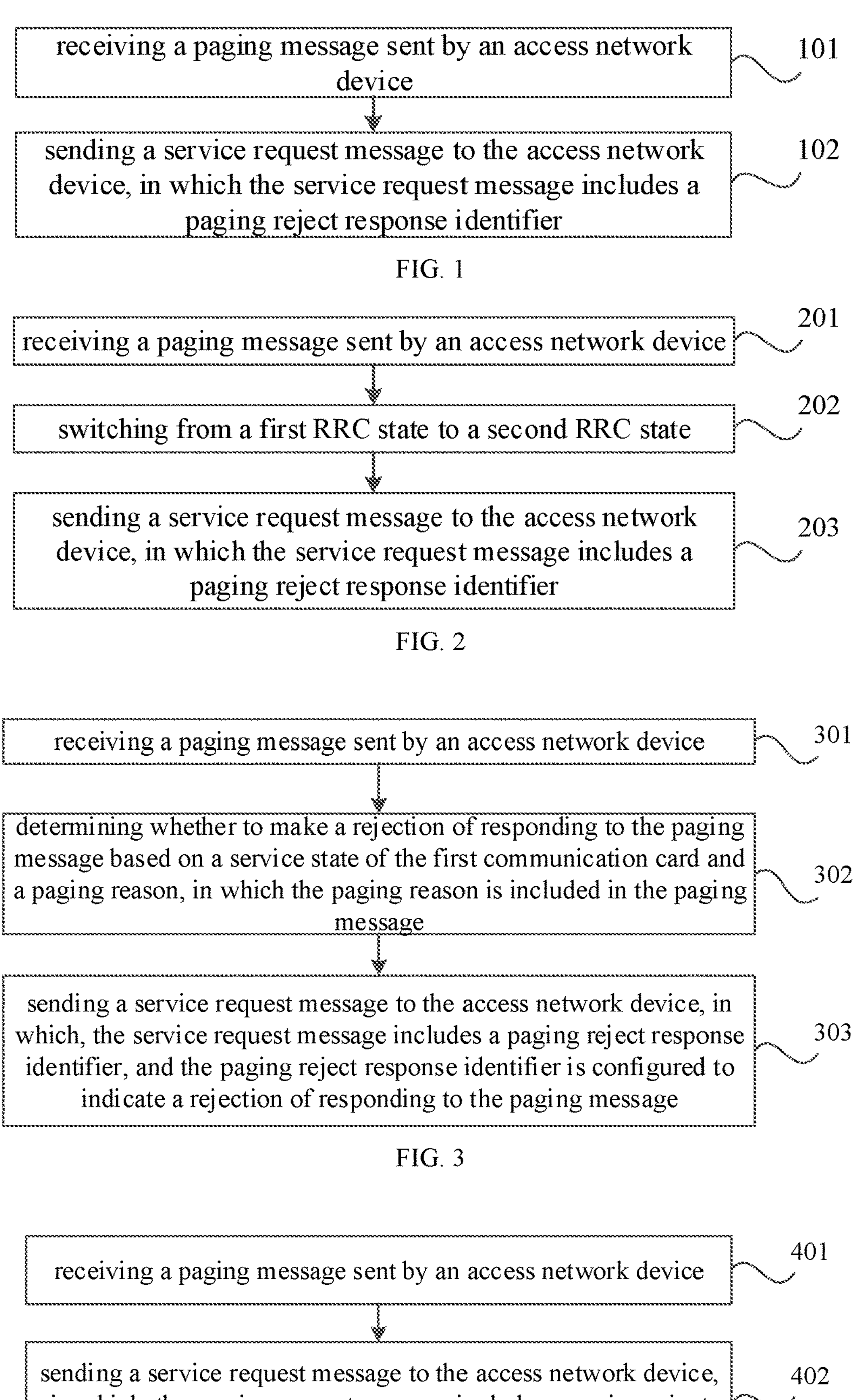
receiving a paging message sent by an access network device
101
sending a service request message to the access network device, in which the service request message includes a paging reject response identifier
102
FIG. 1
receiving a paging message sent by an access network device
201
switching from a first RRC state to a second RRC state
202
sending a service request message to the access network device, in which the service request message includes a paging reject response identifier
203
FIG. 2
receiving a paging message sent by an access network device
301
determining whether to make a rejection of responding to the paging message based on a service state of the first communication card and a paging reason, in which the paging reason is included in the paging message
302
sending a service request message to the access network device, in which, the service request message includes a paging reject response identifier, and the paging reject response identifier is configured to indicate a rejection of responding to the paging message
303
FIG. 3
receiving a paging message sent by an access network device
401
sending a service request message to the access network device, in which, the service request message includes a paging reject response identifier and paging filtering information
402
FIG. 4

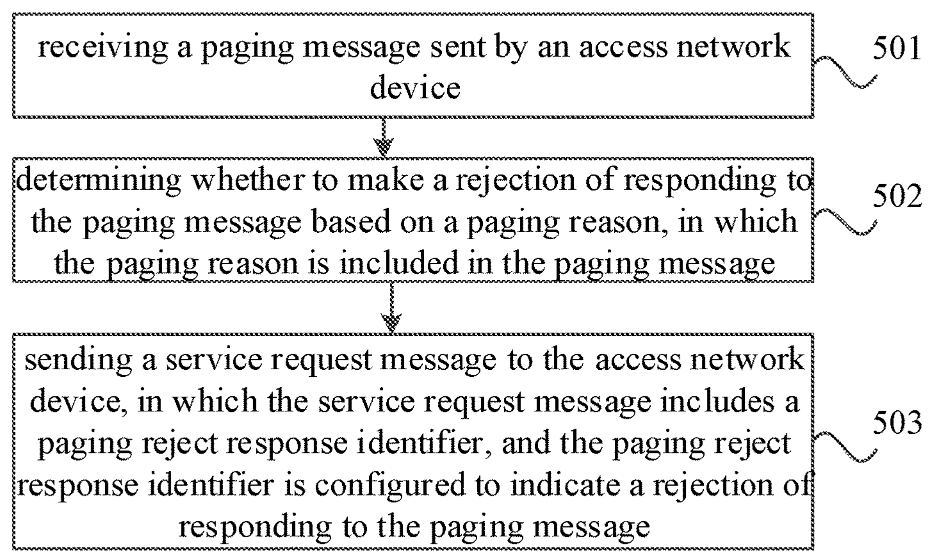
FIG. 5
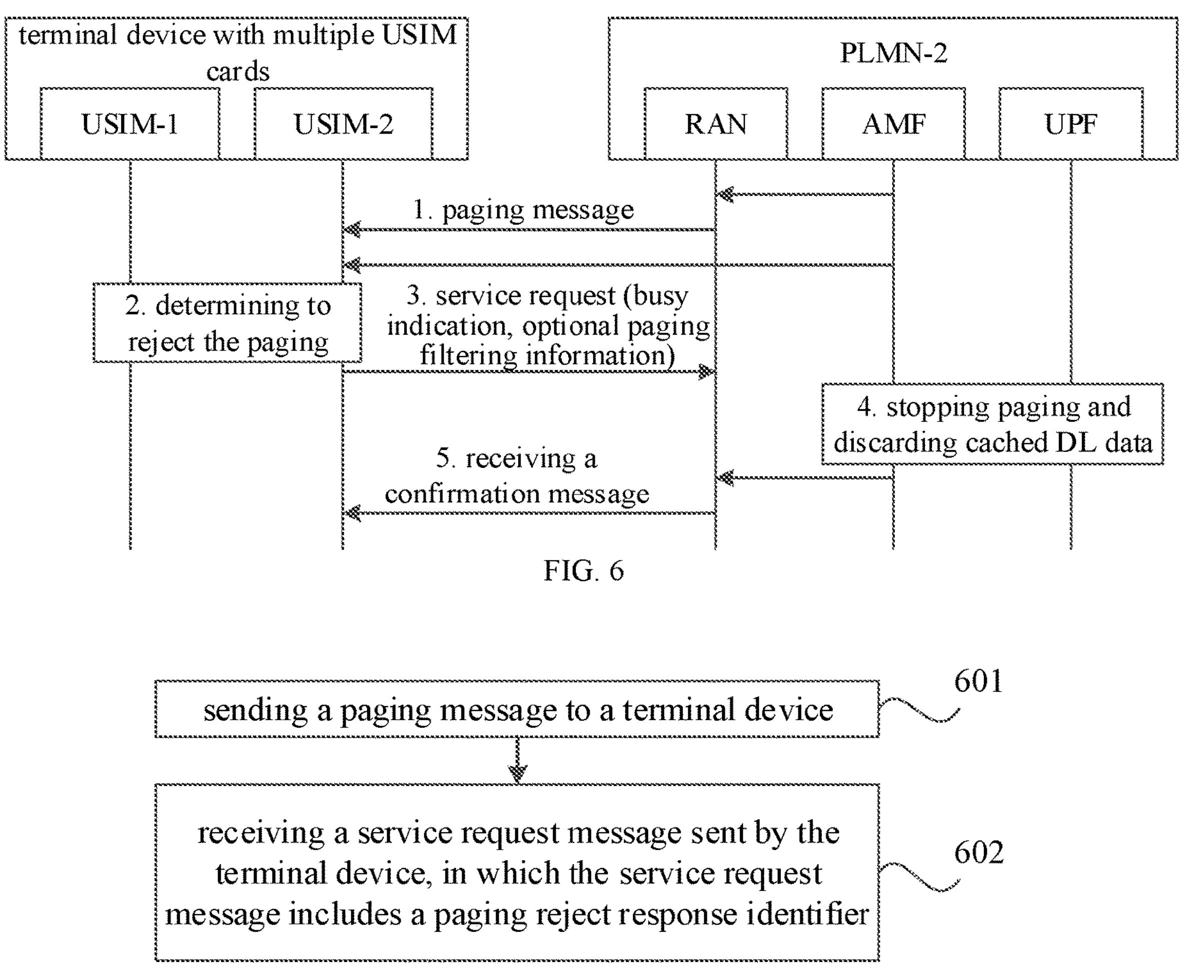
FIG. 6
FIG. 7

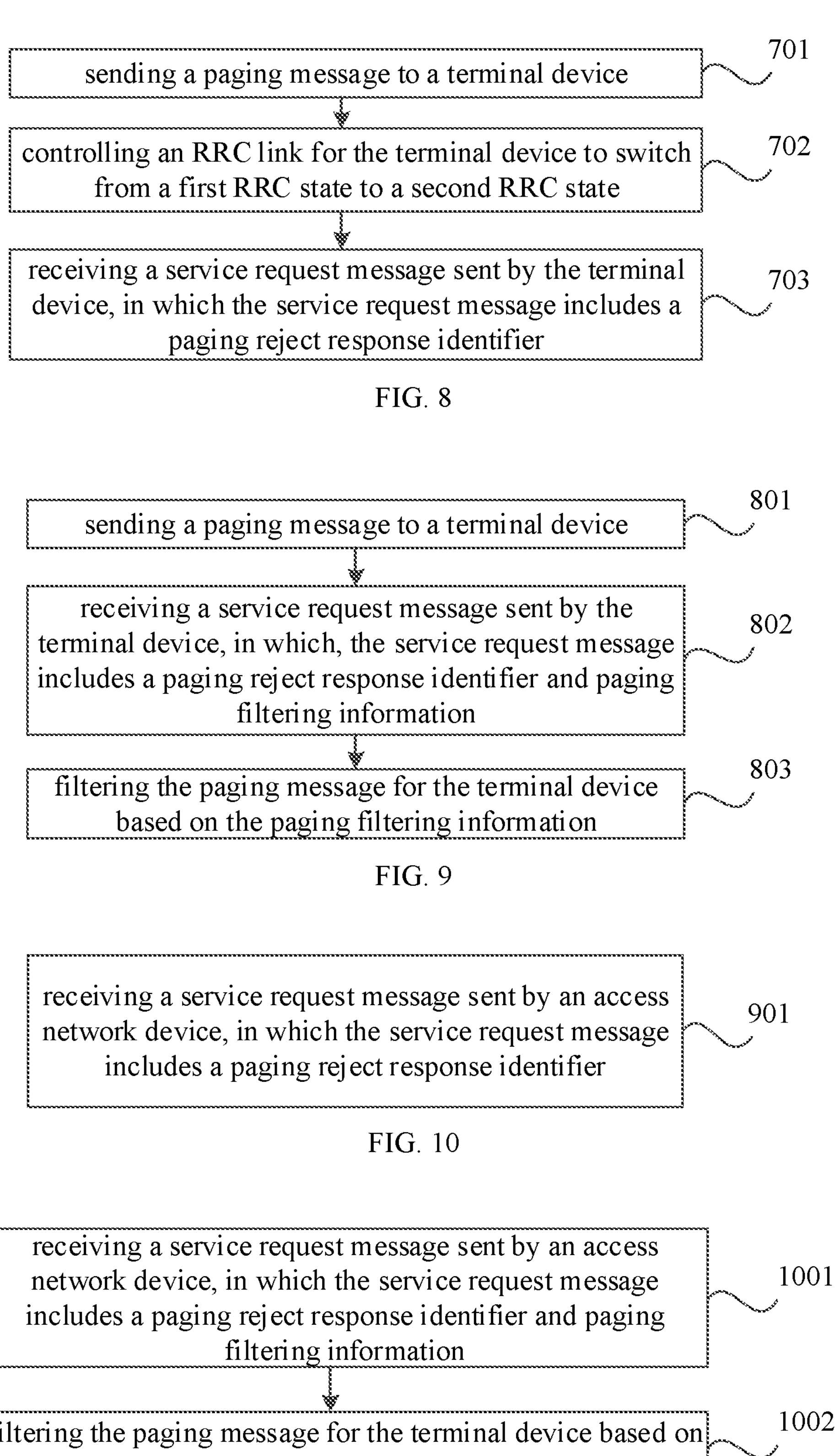
sending a paging message to a terminal device
701
controlling an RRC link for the terminal device to switch from a first RRC state to a second RRC state
702
receiving a service request message sent by the terminal device, in which the service request message includes a paging reject response identifier
703
FIG. 8
sending a paging message to a terminal device
801
receiving a service request message sent by the terminal device, in which, the service request message includes a paging reject response identifier and paging filtering information
802
filtering the paging message for the terminal device based on the paging filtering information
803
FIG. 9
receiving a service request message sent by an access network device, in which the service request message includes a paging reject response identifier
901
FIG. 10
receiving a service request message sent by an access network device, in which the service request message includes a paging reject response identifier and paging filtering information
1001
filtering the paging message for the terminal device based on the paging filtering information
1002
FIG. 11

METHOD AND APPARATUS FOR PAGING REJECTION RESPONSE, AND COMMUNICATION DEVICE

CROSS-REFERENCE TO RELATED APPLICATION

This application is a U.S. national phase application of International Application No. PCT/CN2021/091966, filed on May 6, 2021, the content of which is hereby incorporated by reference in its entirety.

TECHNICAL FIELD

The disclosure relates to a field of wireless communication technologies, and more particularly to a method and an apparatus for rejection of responding to a paging, and a communication device.

BACKGROUND

Presently, some terminal devices can have multiple USIMs (universal subscriber identity modules). The multiple USIMs can sign contracts with the same network operator or with different operators. For example, a user can choose to receive a telephone service by employing a USIM-1 (such as a card 1) and to receive a data service by employing a USIM-2 (such as a card 2) based on services provided by different operators and expenses charged by the different operators.

In case that a terminal device receives a paging from the card 2 when performing a service with a relatively high service level, such as a telephone service, in order to save an air interface resource, the card 1 can make a rejection of responding to the paging. When the terminal device determines rejection of responding to the paging, the method of sending a busy indication (i.e., a paging reject response) to a network is very important.

SUMMARY

A first aspect of embodiments of the disclosure provides a method for rejection of responding to a paging, executed by a terminal device, including: receiving a paging message sent by an access network device; and sending a service request message to the access network device, in which the service request message includes a paging reject response identifier.

A second aspect of embodiments of the disclosure provides another method for rejection of responding to a paging, executed by an access network device, includes: sending a paging message to a terminal device; and receiving a service request message sent by the terminal device, in which the service request message includes a paging reject response identifier.

A third aspect of embodiments of the disclosure provides another method for rejection of responding to a paging, executed by a core network device. The method includes receiving a service request message sent by an access network device, in which the service request message includes a paging reject response identifier.

A fourth aspect of embodiments of the disclosure provides a communication device, including a transceiver; a memory; and a processor. The processor is connected to the transceiver and the memory respectively, and configured to control the transceiver to receive and transmit wireless signals, and implement the method for rejection of responding to the paging according to the first aspect, the second aspect or the third aspect of embodiments of the disclosure by executing computer-executable instructions in the memory.

Additional aspects and advantages of the disclosure will be given in part in the following descriptions, become apparent in part from the following descriptions, or be learned from the practice of the disclosure.

BRIEF DESCRIPTION OF THE DRAWINGS

The above and/or additional aspects and advantages of the disclosure will be apparent and more readily appreciated from the following descriptions made with reference to accompanying drawings, in which:

FIG. 1 is a flow chart illustrating a method for rejection of responding to a paging according to embodiments of the disclosure.

FIG. 2 is a flow chart illustrating a method for rejection of responding to a paging according to another embodiment of the disclosure.

FIG. 3 is a flow chart illustrating a method for rejection of responding to a paging according to another embodiment of the disclosure.

FIG. 4 is a flow chart illustrating a method for rejection of responding to a paging according to another embodiment of the disclosure.

FIG. 5 is a flow chart illustrating a method for rejection of responding to a paging according to another embodiment of the disclosure.

FIG. 6 is a schematic diagram illustrating a process of sending a busy indication when a terminal device is in an RRC-inactive state according to an embodiment of the disclosure.

FIG. 7 is a flow chart illustrating a method for rejection of responding to a paging according to another embodiment of the disclosure.

FIG. 8 is a flow chart illustrating a method for rejection of responding to a paging according to another embodiment of the disclosure.

FIG. 9 is a flow chart illustrating a method for rejection of responding to a paging according to another embodiment of the disclosure.

FIG. 10 is a flow chart illustrating a method for rejection of responding to a paging according to another embodiment of the disclosure.

FIG. 11 is a flow chart illustrating a method for rejection of responding to a paging according to another embodiment of the disclosure.

DETAILED DESCRIPTION

Figure 12:
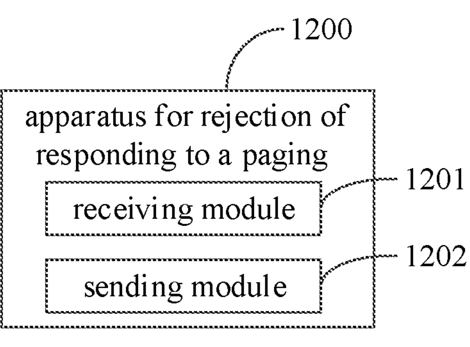
FIG. 12 is a block diagram illustrating an apparatus for rejection of responding to a paging applied to a terminal device according to embodiments of the disclosure.

Reference will now be made herein in detail to exemplary embodiments, examples of which are illustrated in the accompanying drawings. The following description refers to the accompanying drawings in which same numbers in different accompanying drawings represent the same or similar elements unless otherwise represented. The implementations set forth in the following description of exemplary embodiments do not represent all implementations consistent with embodiment of the disclosure. Instead, they are merely examples of apparatuses and methods consistent with some aspects related to embodiments of the disclosure as recited in the appended claims.

Terms used in embodiments of the disclosure are only for the purpose of describing particular embodiments, and are not intended to limit embodiments of the disclosure. As used in embodiments of the disclosure and the appended claims, the singular forms "a" and "the" are intended to include the plural forms as well, unless the context clearly dictates otherwise. It will be understandable that the term "and/or" as used herein refers to and includes any and all possible combinations of one or more of the associated listed items.

It is understandable that although the terms first, second, third, etc. may be used in embodiments of the disclosure to describe various pieces of information, such information should not be limited to these terms. These terms are only used to distinguish the same type of information from each other. For example, without departing from the scope of embodiments of the disclosure, first information may also be referred to as second information, and similarly, the second information may also be referred to as the first information. Depending on the context, the word "if" as used herein can be interpreted as "at the time of", "when" or "in response to determining".

Description will be made in detail below to embodiments of the disclosure. Examples of embodiments are illustrated in the accompanying drawings, in which the same or similar numerals represent the same or similar elements throughout. Embodiments described below with reference to the accompanying drawings are exemplary, which are intended to explain the disclosure and do not be understood a limitation of the disclosure.

Presently, some terminal devices can have multiple USIMs. The multiple USIMs may sign contracts with a same operator or different operators. For example, a user may choose to receive a telephone service by employing a USIM-1 (such as a card 1) and to receive a data service by employing a USIM-2 (such as a card 2) based on services provided by different operators and expenses of different operators.

The 3rd generation partnership project (3GPP) defines a project of Rel-17 MUSIM (Multi-USIM), mainly solving some problems faced by the terminal device with the multiple USIMs. For example, in case that the card 1 receives a paging from the card 2 when performing the telephone service, how the card 1 determines whether to respond to the paging based on a paging reason value (such as a speech service) in order to save an air interface resource. For another example, how to avoid a paging collision problem between two cards, such as how the card 1, which is currently performing the telephone service, leaves its network to respond to the paging of the card 2, and further how the terminal device and the network negotiate to support the MUSIM characteristic.

In the related art, when the terminal device is in an idle state, in case that the terminal device receives a paging message and decides not to respond to the paging, the terminal device may initiate a service request message, carry a busy indication or a paging reject indication in the service request message, and send the service request message to the network, such that the network may perform corresponding processing after receiving the service request message, such as stopping paging and releasing cached downlink (DL) data. The current standard only supports sending the busy indication through a non-access stratum (NAS) message.

In case that the terminal device is in a connection management-idle (CM-IDLE) state and a registration management-registered (RM-REGISTERED) state simultaneously, the UE shall (unless otherwise stipulated in Article 5.3.4.1):

respond to the paging by performing a service request procedure (see article 4.2.3.2 of TS 23.502[3]), unless the terminal device is in an MICO (mobile initiated connection only) mode (see article 5.4.1.3); and perform the service request procedure (refer to article 4.2.3.2 of TS 23.502[3]) when the terminal device has an uplink signaling or user data to be sent. A specific condition applies to a local area data network (LADN), see Article 5.6.5.

However, presently, the terminal device may respond to the paging through the service request message only when the terminal device is in the idle state. It is impossible that the busy indication or the paging reject indication is sent to the network through the current existing service request message when the terminal device is in a connected state. A signaling related to recovering a data user plane is mainly sent when the terminal device is in the connected state.

Moreover, in case that the terminal device is in an RRC (radio resource control)_CONNECTED state, the service request message may only be configured to initiate an activation of the data user plane, and the paging is initiated by an RAN base station. Response to the paging is related from the UE to the RAN (radio access network) base station, and the response to the core network is not supported.

Presently, the standard has three RRC states, i.e.:

an RRC_Idle state, in which, no service exists in the RRC_Idle state, the air interface resource is released, and context is also released;

an RRC_inactive state, in which, no service exists or the service has been suspended in the RRC_inactive state, the air interface resource is released, but partial context of the terminal device is still reserved, to quickly recover the service; and an RRC_connected state, in which, the service is being transmitted or the air interface resource have been allocated in the RRC_connected state, and the complete context of the terminal device is reserved.

In case that the terminal device is in the CM-CONNECTED state under the RRC inactive state, the terminal device may recover an RRC connection:

due to uplink data pending;

due to a mobile initiated NAS signaling procedure;

as a response to an RAN paging;

for notifying the network that the terminal device has left an RAN notification area;

after a timer is periodically updated for the RAN notification area.

For the above problems, the disclosure provides a method and an apparatus for rejection of responding to a paging, and a communication device.

FIG. 1 is a flow chart illustrating a method for rejection of responding to a paging according to an embodiment of the disclosure. The method for rejection of responding to the paging may be executed by a terminal device.

The terminal device may be a device that provides a speech and/or data connectivity to a user, a handheld device with a wireless connection function, or other processing device connected to a wireless modem, etc. Names of the terminal device may be different in different systems. For example, the terminal device may be called a user equipment (UE) in a 5G system. A wireless terminal device may communicate with one or more core networks (CNs) via the RAN. The wireless terminal device may be a mobile terminal device, such as a mobile phone (or cellular phone) and a computer with a mobile terminal device. For example, it may be a portable, pocket-sized, handheld, built-in computer or vehicle-mounted mobile apparatus, which exchange languages and/or data with the wireless access network.

For example, the terminal device may be a device such as a personal communication service (PCS) telephone, a cordless telephone, a session initiated protocol (SIP) telephone, a wireless local loop (WLL) station, a personal digital assistant (PDA). The wireless terminal device may also be called a system, a subscriber unit, a subscriber station, a mobile station, a mobile, a remote station, an access point, a remote terminal, an access terminal, a user terminal, a user agent, and a user device, which is not limited in embodiments.

As illustrated in FIG. 1, a method for rejection of responding to a paging may include the following.

At block 101, a paging message sent by an access network device is received.

In embodiments of the disclosure, take the access network device being a base station as an example. The base station may include multiple cells which provide services for the terminal device. According to different specific application scenes, each cell may include multiple transmission reception points (also called transmit receive points, TRPs), may be a device in an access network that communicates with the wireless terminal device by one or more sectors over an air interface, or may be other names. For example, the base station related in embodiments of the disclosure may be a base transceiver station (BTS) in a global system for mobile communications (GSM) or code division multiple access (CDMA), a base station (NodeB) in a wide-band code division multiple access (WCDMA), an evolutional Node B (abbreviated as eNB or e-NodeB) in a long-term evolution (LTE) system, a 5G base station (abbreviated as gNB) in a 5G network architecture (next generation system), a home evolved Node B (HeNB), a relay node, a home base station (femto), a pico, etc., which is not limited in embodiments of the disclosure.

In embodiments of the disclosure, the paging message may be forwarded by a core network device to the terminal device through the access network device.

At block 102, a service request message is sent to the access network device, in which the service request message includes a paging reject response identifier.

In embodiments of the disclosure, in case that the terminal device determines to make a rejection of responding to the paging message after receiving the paging message, the terminal device may send the service request message to the access network device. The service request message includes a busy indication identifier or the paging reject response identifier. Therefore, the busy indication identifier or the paging reject response identifier is sent to a network side through the service request message, such that the network side may perform corresponding processing (such as stopping paging the terminal device continuously, etc.) based on the busy indication identifier or the paging reject response identifier, thereby saving corresponding resources.

With the method for rejection of responding to the paging according to embodiments of the disclosure, the terminal device receives the paging message sent by the access network device and sends the service request message to the access network device, in which the service request message includes the paging reject response identifier. Therefore, the paging reject response identifier is sent to the network side through the service request message, such that the network side may perform corresponding processing (such as stopping paging the terminal device continuously) based on the paging reject response identifier, to save corresponding resources.

It should be noted that, the above possible implementations may be executed separately or in combination, which is not limited in embodiments of the disclosure.

Embodiments of the disclosure provide another method for rejection of responding to a paging. FIG. 2 is a flow chart illustrating a method for rejection of responding to a paging according to another embodiment of the disclosure. The method for rejection of responding to the paging may be executed by the terminal device. The method for rejection of responding to the paging may be executed separately, or in combination with any embodiment in the disclosure or possible implementations in any embodiment, or may also be executed in combination with any technical solution in the related art.

As illustrated in FIG. 2, the method for rejection of responding to the paging may include the following.

At block 201, a paging message sent by an access network device is received.

In the embodiment of the disclosure, the action at block 201 may be implemented in any one of embodiments of the disclosure, which is not limited in embodiments of the disclosure and not elaborated.

In a possible implementation of the embodiment of the disclosure, a state in which the terminal device receives the paging message may be a first RRC state. For example, the terminal device may receive the paging message sent by the access network device in an RRC_inactive state when the first RRC state is the RRC inactive (i.e., RRC_inactive) state.

At block 202, a first radio resource control (RRC) state is switched to a second RRC state.

In embodiments of the disclosure, the terminal device may send the busy indication identifier or the paging reject response identifier to the network side by enhancing an existing service request procedure. The enhancement refers to restoring the terminal device and the access network device from the first RRC state to the second RRC state.

Therefore, in embodiments of the disclosure, the terminal device may be switched from the first RRC state to the second RRC state in case that the terminal device refuses to respond to the paging message.

In a possible implementation of embodiments of the disclosure, the access network device may control an RRC link for the terminal device to switch from the first RRC state to the second RRC state.

In a possible implementation of the disclosure, the first RRC state may be the RRC inactive (i.e., RRC_inactive) state, and the second RRC state may be an RRC connected (i.e., RRC_connected) state. The RRC_inactive state means that there was service data transmitted before, but the service has been suspended, and an air interface resource is released. It should be understood that, when the terminal device is in the RRC_inactive state, the terminal device needs to reapply for resources to enter the RRC_connected state if the service request message needs to be sent.

At block 203, a service request message is sent to the access network device, in which the service request message includes a paging reject response identifier.

In embodiments of the disclosure, the terminal device may send the service request message to the access network device after being switched to the second RRC state. That is, the terminal device may send the service request message to the access network device in case that the terminal device determines rejection of responding to the paging message. The service request message includes the busy indication identifier or the paging reject response identifier, which is configured to indicate that the terminal device refuses to respond to the paging message.

Exemplary illustration is provided by taking the first RRC state as the RRC_inactive state and the second RRC state as the RRC_connected state. When the terminal device is in the CM-CONNECTED state and the RRC_inactive state, the terminal device may send the busy indication identifier or the paging reject response identifier to the network side by enhancing the existing service request procedure. That is, the terminal device and the access network device may be recovered from the RRC_inactive state to the RRC_connected state, and then the terminal device may send the busy indication identifier or the paging reject response identifier to the access network device through the NAS message.

In a possible implementation of embodiments of the disclosure, the access network device may forward the service request message to a core network device after receiving the service request message. Accordingly, after receiving the service request message, the core network device may stop paging the terminal device based on the busy indication identifier or the paging reject response identifier, or may stop paging the terminal device and discard cached downlink data based on the busy indication identifier or the paging reject response identifier.

With the method for rejection of responding to the paging of embodiments of the disclosure, the terminal device receives the paging message sent by the access network device and sends the service request message to the access network device, in which the service request message includes the paging reject response identifier. Therefore, the paging reject response identifier is sent to the network side through the service request message, such that the network side may perform corresponding processing (such as stopping paging the terminal device continuously) according to the paging reject response identifier, to save corresponding resources.

It should be noted that, the above possible implementations may be executed separately or in combination, which is not limited in embodiments of the disclosure.

Embodiments of the disclosure provide another method for rejection of responding to the paging. FIG. 3 is a flow chart illustrating a method for rejection of responding to a paging according to another embodiment of the disclosure. The method for rejection of responding to the paging may be executed by a terminal device. The method for rejection of responding the paging may be executed alone, in combination with any embodiment in the disclosure or possible implementations in any embodiment, or in combination with any technical solution in the related art.

As illustrated in FIG. 3, the method for rejection of responding to the paging may include the following.

At block 301, a paging message sent by an access network device is received.

In embodiments of the disclosure, the terminal device may have multiple communication cards. In order to distinguish different communication cards in the terminal device conveniently, in the disclosure, one communication card may be called a first communication card and the other communication card may be called a second communication card. The paging message may be received by the terminal device using the second communication card.

At block 302, it is determined whether to make a rejection of responding to the paging message based on a service state of the first communication card and a paging reason, in which the paging reason is included in the paging message.

In embodiments of the disclosure, the paging reason may be a reason for paging the second communication card. For example, when a certain communication card in the terminal device is paged, it may be marked why the communication card is paged, that is, the paging reason is marked. For example, the marked paging reason may be a speech type paging, a data service download paging, a system group messaging (i.e., short message system message) paging, and the like.

In embodiments of the disclosure, the terminal device may determine whether to make a rejection of responding to the paging message based on the service state of the first communication card and the paging reason.

As an example, when a current service of the first communication card is a service with a relatively high service level, such as a speech service, it is assumed that the paging reason in the paging message is a service with a relatively low service level, such as a general data service paging. Since the service level of the general data service is lower than the service level of the speech service, the speech service of the first communication card may be guaranteed preferentially, and the general data service of the second communication card may be rejected, that is, the terminal device may refuse to respond to the paging message above.

As another example, in case that the current service of the first communication card is the service with the relatively low service level and the paging reason in the paging message is the service with the relatively high service level, the terminal device may not refuse to respond to the paging message.

At block 303, a service request message is sent to the access network device, in which the service request message includes a paging reject response identifier. The paging reject response identifier is configured to indicate rejection of responding to the paging message.

In embodiments of the disclosure, the action at block 303 may be implemented in any implementation in embodiments of the disclosure, which is not limited in embodiments of the disclosure and not elaborated here.

With the method for rejection of responding to the paging of embodiments of the disclosure, the terminal device receives the paging message sent by the access network device and sends the service request message to the access network device, in which the service request message includes the paging reject response identifier. Therefore, the paging reject response identifier is sent to the network side through the service request message, such that the network side may perform corresponding processing (such as stopping paging the terminal device continuously) based on the paging reject response identifier, to save corresponding resources.

It should be noted that, the above possible implementations may be executed separately or in combination, which is not limited in embodiments of the disclosure.

Embodiments of the disclosure provide another method for rejection of responding to the paging. FIG. 4 is a flow chart illustrating a method for rejection of responding to a paging according to another embodiment of the disclosure. The method for rejection of responding to the paging may be executed by a terminal device. The method for rejection of responding to the paging may be executed alone, in combination with any embodiment in the disclosure or possible implementations in any embodiment, or in combination with any technical solution in the related art.

As illustrated in FIG. 4, the method for rejection of responding to the paging may include the following.

At block 401, a paging message sent by an access network device is received.

At block 402, a service request message is sent to the access network device, in which the service request message includes a paging reject response identifier and paging filtering information.

In embodiments of the disclosure, the action at blocks 401 to 402 may be implemented in any implementation of embodiments of the disclosure, which is not limited in the embodiments of the disclosure, and not elaborated herein.

In embodiment of the disclosure, the service request message sent by the terminal device to the access network device may also include the paging filtering information. The paging filtering information is configured to filter the paging message for the terminal device.

In a possible implementation of embodiments of the disclosure, the access network device may filter the paging message for the terminal device based on the paging filtering information after receiving the service request message.

For example, when the paging filtering information indicates filtering of a service paging with a relatively low service level, the access network device may, based on the paging filtering information, filter the paging message corresponding to a paging reason which is the service paging with the relatively low service level. For example, the paging message corresponding to the paging reason which is the general data service paging, the short message system message paging and the like may be filtered.

In another possible implementation of embodiments of the disclosure, the access network device may forward the service request message to the core network device after receiving the service request message, and the core network device may filter the paging message for the terminal device based on the paging filtering information.

As an example, the core network device, such as an AMF, may send a filtering rule in the paging filtering information to a network element entity, and the network element entity may screen and filter downlink data for the terminal device based on the filtering rule.

With the method for rejection of responding to the paging of embodiments of the disclosure, the terminal device receives the paging message sent by the access network device and sends the service request message to the access network device, in which the service request message includes the paging reject response identifier. Therefore, the paging reject response identifier is sent to the network side through the service request message, such that the network side may perform corresponding processing (such as stopping paging the terminal device continuously) based on the paging reject response identifier, to save corresponding resources.

It should be noted that the above possible implementations may be executed separately or in combination, which is not limited in embodiments of the disclosure.

Embodiments of the disclosure provide another method for rejection of responding to the paging. FIG. 5 is a flow chart illustrating a method for rejection of responding to a paging according to another embodiment of the disclosure. The method for rejection of responding to the paging may be executed by a terminal device. The method for rejection of responding to the paging may be executed alone, in combination with any embodiment in the disclosure or possible implementations in any embodiment, or in combination with any technical solution in the related art.

As illustrated in FIG. 5, the method for rejection of responding to the paging may include the following.

At block 501, a paging message sent by an access network device is received.

In embodiments of the disclosure, the action at block 501 may employ any implementation in embodiments of the disclosure, which is not limited in the embodiments of the disclosure, and not elaborated herein.

At block 502, it is determined whether to make a rejection of responding to the paging message based on a paging reason, in which the paging reason is included in the paging message.

In embodiments of the disclosure, when the terminal device only has one communication card, the paging reason may be a reason for paging the only communication card. When the terminal device has the multiple communication cards, the paging reason may be a reason for paging one of the multiple communication cards, such as the second communication card.

For example, when a certain mobile phone number in the terminal device is paged, it may be marked why the mobile phone number is paged, that is, the paging reason is marked. For example, the marked paging reason may be the speech type paging, the data service download paging, the system group messaging (i.e., short message system message) paging, and the like.

In embodiments of the disclosure, the terminal device may determine whether to make a rejection of responding to the paging message based on the paging reason in the paging message.

As an example, the terminal device may refuse to respond to the paging message when the paging reason is the service with the relatively low service level, such as the general data service paging, while the terminal device may not refuse to respond to the paging message when the paging reason is the service paging with the relatively high service level.

At block 503, a service request message is sent to the access network device, in which the service request message includes a paging reject response identifier. The paging reject response identifier is configured to indicate rejection of responding to the paging message.

In embodiments of the disclosure, the action at block 503 may be implemented in any implementation in embodiments of the disclosure, which is not limited in embodiments of the disclosure and not elaborated here.

With the method for rejection of responding to the paging of embodiments of the disclosure, the terminal device receives the paging message sent by the access network device and sends the service request message to the access network device, in which the service request message includes the paging reject response identifier. Therefore, the paging reject response identifier is sent to the network side through the service request message, such that the network side may perform the corresponding processing (such as stopping paging the terminal device continuously) based on the paging reject response identifier, to save the corresponding resources.

It should be noted that, the above possible implementations may be executed separately or in combination, which is not limited in embodiments of the disclosure.

As an example, the terminal device has two communication cards, respectively a USIM-1 and a USIM-2, and the access network device is an RAN base station. As illustrated in FIG. 6, it is assumed that the USIM-2 receives a paging message sent by a PLMN (public land mobile network)-2

(corresponding to the step 1), and the USIM-2 determines rejection of responding to a paging for the USIM-2 based on a condition such as the service of the USIM-1, a paging reason or the like after receiving the paging message (corresponding to the step 2). In this case, the USIM-2 is in the CM-CONNECTED state and the RRC_inactive state.

The USIM-2 may first recover to the RRC_connected state, trigger a service request procedure, and carry a busy indication or a paging reject indication in the service request message, and alternatively carry paging filtering information (corresponding to step 3). The RRC_inactive state means that there was service data transmitted before, but the service has been suspended, and the air interface resource is released. In case that the USIM-2 is in the RRC_inactive state, when the USIM-2 needs to send the service request message, the USIM-2 needs to reapply for resources to enter the RRC_connected state.

After receiving the service request message forwarded by the RAN base station, the AMF stops paging the USIM-2 (that is, stops paging the USIM-2 continuously) and discards already cached DL (Downlink) data (corresponding to step 4) based on the busy indication.

The UPF refers to a user plane function.

Alternatively, if the service request message carries the paging filtering information, the AMF may send the filtering rule to the network element entity, and screen and filter the downlink data from the terminal device.

The AMF may also send a service accept message to the UE (corresponding to step 5).

Embodiments of the disclosure provide another method for rejection of responding to a paging. FIG. 7 is a flow chart illustrating a method for rejection of responding to a paging according to another embodiment of the disclosure. The method for rejection of responding to the paging may be executed by an access network device. The method for rejection of responding to the paging may be executed separately, or in combination with any embodiment in the disclosure or possible implementations in any embodiment, or may also be in combination with any technical solution in the related art.

As illustrated in FIG. 7, the method for rejection of responding to the paging may include the following.

At block 601, a paging message is sent to a terminal device.

At block 602, a service request message sent by the terminal device is received, in which the service request message includes a paging reject response identifier.

In embodiments of the disclosure, the access network device may send the paging message to the terminal device. The terminal device may determine whether to make a rejection of responding to the paging message after receiving the paging message. The terminal device may send the service request message to the access network device when determining to make the rejection of responding to the paging message, and the access network device may receive the service request message sent by the terminal device correspondingly. The service request message includes a busy indication identifier or a paging reject response identifier, which is configured to indicate that the terminal device refuses to respond to the above paging message.

It should be noted that, description of the method for rejection of responding to the paging executed by the terminal device side in any of the above embodiments with reference to FIG. 1 to FIG. 5 is also applicable to the method for rejection of responding to the paging executed by the access network device side in this embodiment, which has the same implementation principle, and is not elaborated herein.

With the method for rejection of responding to the paging of embodiments of the disclosure, the access network device sends the paging message to the terminal device, and receives the service request message sent by the terminal device, in which the service request message includes the paging reject response identifier. Therefore, the terminal device may send the paging reject response identifier to the access network device through the service request message, such that the network side may perform corresponding processing (such as stopping paging the terminal device, etc.) based on the paging reject response identifier, to save corresponding resources.

It should be noted that the above possible implementations may be executed separately or in combination, which is not limited in embodiments of the disclosure.

Embodiments of the disclosure provide another method for rejection of responding to a paging. FIG. 8 is a flow chart illustrating a method for rejection of responding to a paging according to another embodiment of the disclosure. The method for rejection of responding to the paging may be executed by an access network device. The method for rejection of responding to the paging may be executed separately, or in combination with any embodiment in the disclosure or possible implementations in any embodiment, or may also be in combination with any technical solution in the related art.

As illustrated in FIG. 8, the method for rejection of responding to the paging may include the following.

At block 701, a paging message is sent to a terminal device.

At block 702, an RRC link for the terminal device is controlled to switch from a first RRC state to a second RRC state.

In embodiments of the disclosure, the terminal device may send a busy indication identifier or a paging reject response identifier to the network side by enhancing an existing service request procedure. The enhancement refers to restoring the terminal device and the access network device from the first RRC state to the second RRC state.

Therefore, in embodiments of the disclosure, the terminal device may switch from the first RRC state to the second RRC state when making the rejection of responding to the paging message. Moreover, the access network device may control the RRC link for the terminal device to switch from the first RRC state to the second RRC state.

In a possible implementation of the disclosure, the first RRC state may be an RRC_inactive state and the second RRC state may be an RRC_connected state.

At block 703, a service request message sent by the terminal device is received, in which the service request message includes the paging reject response identifier.

In embodiments of the disclosure, the terminal device may determine whether to make a rejection of responding to the paging message based on the paging message. The terminal device may send the service request message to the access network device when determining to make the rejection of responding to the paging message, and the access network device may receive the service request message sent by the terminal device correspondingly. The service request message includes the busy indication identifier or the paging reject response identifier, which is configured to indicate that the terminal device refuses to respond to the above paging message.

It should be noted that, description of the method for rejection of responding to the paging executed by the terminal device side in any of the above embodiments with reference to FIG. 1 to FIG. 5 is also applicable to the method for rejection of responding to a paging executed by the access network device side in this embodiment, which has the same implementation principle, and is not elaborated herein.

Exemplary illustration is provided by taking the first RRC state as the RRC_inactive state and the second RRC state as the RRC_connected state. When the terminal device is in the CM-CONNECTED state and the RRC_inactive state, the terminal device may send the busy indication identifier or the paging reject response identifier to the network side by enhancing the existing service request procedure. That is, the terminal device and the access network device may be recovered from the RRC_inactive state to the RRC_connected state, and then the terminal device may send the busy indication identifier or the paging reject response identifier to the access network device through the NAS message. The access network device may obtain the service request message sent by the terminal device accordingly.

In a possible implementation of embodiments of the disclosure, the access network device may further forward the service request message to a core network device after receiving the service request message. Accordingly, after receiving the service request message, the core network device may stop paging the terminal device based on the busy indication identifier or the paging reject response identifier, or may stop paging the terminal device and discard cached downlink data based on the busy indication identifier or the paging reject response identifier.

With the method for rejection of responding to the paging of embodiments of the disclosure, the access network device sends the paging message to the terminal device, and receives the service request message sent by the terminal device, in which the service request message includes the paging reject response identifier. Therefore, the terminal device may send the paging reject response identifier to the network side through the service request message, such that the network side may perform corresponding processing (such as stopping paging the terminal device continuously, etc.) based on the paging reject response identifier, to save corresponding resources.

It should be noted that, the above possible implementations may be executed separately or in combination, which is not limited in embodiments of the disclosure.

Embodiments of the disclosure provide another method for rejection of responding to a paging. FIG. 9 is a flow chart illustrating a method for rejection of responding to a paging according to another embodiment of the disclosure. The method for rejection of responding to the paging may be executed by an access network device. The method for rejection of responding to the paging may be executed separately, or in combination with any embodiment in the disclosure or possible implementations in any embodiment, or may also be in combination with any technical solution in the related art.

As illustrated in FIG. 9, the method for rejection of responding to the paging may include the following.

At block 801, a paging message is sent to a terminal device.

At block 802, a service request message sent by the terminal device is received, in which the service request message includes a paging reject response identifier and paging filtering information.

In embodiments of the disclosure, actions at blocks 801 and 802 may be respectively implemented in any way described in embodiments of the disclosure, which is not limited in embodiments of the disclosure, and not elaborated herein.

At block 803, the paging message for the terminal device is filtered based on the paging filtering information.

In embodiments of the disclosure, the access network device may filter the paging message for the terminal device based on the paging filtering information after receiving the service request message sent by the terminal device.

For example, when the paging filtering information indicates filtering of a service paging with a relatively low service level, the access network device may filter the paging message corresponding to a paging reason which is the service paging with the relatively low service level based on the paging filtering information, such as, filtering the paging message corresponding to the paging reason which is the general data service paging, the short message system message paging and the like.

In a possible implementation of embodiments of the disclosure, the access network device may further send the service request message to a core network device. Accordingly, after the service request message is received, the core network device may stop paging the terminal device based on the paging reject response identifier, or may stop paging the terminal device and discard cached downlink data based on the paging reject response identifier.

Alternatively, in the case that the service request message includes the paging filtering information, the core network device may further filter the paging message for the terminal device based on the paging filtering information.

As an example, the core network device, such as an AMF, may send a filtering rule in the paging filtering information to a network element entity, and the network element entity may screen and filter downlink data for the terminal device based on the filtering rule.

With the method for rejection of responding to the paging of embodiments of the disclosure, the access network device sends the paging message to the terminal device, and receives the service request message sent by the terminal device, in which the service request message includes the paging reject response identifier. Therefore, the terminal device may send the paging reject response identifier to the network side through the service request message, such that the network side may perform corresponding processing (such as stopping paging the terminal device, etc.) based on the paging reject response identifier, to save corresponding resources.

It should be noted that, the above possible implementations may be executed separately or in combination, which is not limited in embodiments of the disclosure.

Embodiments of the disclosure provide another method for rejection of responding to a paging. FIG. 10 is a flow chart illustrating a method for rejection of responding to a paging according to another embodiment of the disclosure. The method for rejection of responding to the paging may be executed by a core network device.

As illustrated in FIG. 10, the method for rejection of responding to the paging may include the following.

At block 901, a service request message sent by an access network device is received, in which, the service request message includes a paging reject response identifier.

In embodiments of the disclosure, the access network device may send a paging message to a terminal device. The terminal device may determine whether to make a rejection of responding to the paging message based on the paging message after receiving the paging message. The terminal device may send the service request message to the access network device when determining to make the rejection of responding to the paging message. Correspondingly, the access network device may forward the service request message to the core network device after receiving the service request message. Correspondingly, the core network device may receive the service request message sent by the access network device. The service request message includes the paging reject response identifier for indicating that the terminal device refuses to respond to the paging message.

In a possible implementation of embodiments of the disclosure, after receiving the service request message, the core network device may stop paging the terminal device based on the paging reject response identifier or may stop paging the terminal device and discard the cached downlink data based on the paging reject response identifier.

It should be noted that, description of the method for rejection of responding to the paging executed by the terminal device side in any of the above embodiments with reference to FIG. 1 to FIG. 5 is also applicable to the method for rejection of responding to the paging executed by the core network device side in this embodiment, which has the same implementation principle, and is not elaborated herein.

With the method for rejection of responding to the paging of embodiments of the disclosure, the core network device receives the service request message sent by the access network device, in which, the service request message includes the paging reject response identifier. Therefore, the paging reject response identifier is sent to the network side through the service request message, such that the network side may perform corresponding processing (such as stopping paging the terminal device continuously) based on the paging reject response identifier, to save corresponding resources.

Embodiments of the disclosure provide another method for rejection of responding to a paging. FIG. 11 is a flow chart illustrating a method for rejection of responding to a paging according to another embodiment of the disclosure. The method for rejection of responding to the paging may be executed by a core network device. The method for rejection of responding to the paging may be executed separately, or in combination with any embodiment in the disclosure or possible implementations in any embodiment, or may also be in combination with any technical solution in the related art.

As illustrated in FIG. 11, the method for rejection of responding to the paging may include the following.

At block 1001, a service request message sent by an access network device is received, in which the service request message includes a paging reject response identifier and paging filtering information.

In embodiments of the disclosure, action at block 1001 may be respectively implemented in any way described in embodiments of the disclosure, which is not limited in embodiments of the disclosure, and not elaborated herein.

At block 1002, a paging message for the terminal device is filtered based on the paging filtering information.

In embodiments of the disclosure, the access network device may filter the paging message for the terminal device based on the paging filtering information after receiving the service request message.

As an example, the core network device, such as an AMF, may send a filtering rule in the paging filtering information to a network element entity, and the network element entity may screen and filter downlink data for the terminal device based on the filtering rule.

With the method for rejection of responding to the paging of embodiments of the disclosure, the core network device receives the service request message sent by the access network device, in which, the service request message includes the paging reject response identifier. Therefore, the paging reject response identifier is sent to the network side through the service request message, such that the network side may perform corresponding processing (such as stopping paging the terminal device continuously) based on the paging reject response identifier, to save corresponding resources.

It should be noted that, the above possible implementations may be executed separately or in combination, which is not limited in embodiments of the disclosure.

Corresponding to the method for rejection of responding to the paging provided by embodiments according to FIGS. 1 to 5, the disclosure also provides an apparatus for rejection of responding to a paging. Since the apparatus for rejection of responding to the paging according to embodiments of the disclosure corresponds to the method for rejection of responding to the paging provided by embodiments according to FIGS. 1 to 5, the implementation of the method for rejection of responding to the paging is also applicable to the apparatus for rejection of responding to the paging according to embodiments of the disclosure, which is not described in detail in embodiments of the disclosure.

FIG. 12 is a block diagram illustrating an apparatus for rejection of responding to a paging according to embodiments of the disclosure. The apparatus may be applied to a terminal device.

As illustrated in FIG. 12, the apparatus 1200 for rejection of responding to the paging may include: a receiving module 1201 and a sending module 1202.

The receiving module 1201 is configured to receive a paging message sent by an access network device.

The sending module 1202 is configured to send a service request message to the access network device. The service request message includes a paging reject response identifier.

Alternatively, the paging reject response identifier is configured to indicate a rejection of responding to the paging message.

Alternatively, the apparatus 1200 for rejection of responding to the paging may further include:

- a switching module, configured to switch from a first radio resource control (RRC) state to a second RRC state.

Alternatively, the terminal device receives the paging message in an RRC inactive state.

Alternatively, the first RRC state is an RRC inactive state, and the second RRC state is an RRC connected state.

Alternatively, the terminal device has a first communication card and a second communication card, and the terminal device receives the paging message by employing the second communication card.

Alternatively, the apparatus 1200 for rejection of responding to the paging may further include:

- a first determining module, configured to determine whether to make a rejection of responding to the paging message based on a service state of the first communication card and a paging reason. The paging reason is included in the paging message.

Alternatively, the service request message further includes paging filtering information. The paging filtering information is configured to filter the paging message for the terminal device.

Alternatively, the apparatus 1200 for rejection of responding to the paging may further include:

a second determining module, configured to determine whether to make a rejection of responding to the paging message based on a paging reason. The paging reason is included in the paging message.

With the apparatus for rejection of responding to the paging according to embodiments of the disclosure, the terminal device receives the paging message sent by the access network device and sends the service request message to the access network device, in which the service request message includes the paging reject response identifier. Therefore, the paging reject response identifier is sent to a network side through the service request message, such that the network side may perform corresponding processing (such as stopping paging the terminal device continuously) based on the paging reject response identifier, to save corresponding resources.

Corresponding to the method for rejection of responding to the paging provided by embodiments according to FIGS. 7 to 9, the disclosure also provides an apparatus for rejection of responding to a paging. Since the apparatus for rejection of responding to the paging according to embodiments of the disclosure corresponds to the method for rejection of responding to the paging provided by embodiments according to FIGS. 7 to 9, the implementation of the method for rejection of responding to the paging is also applicable to the apparatus for rejection of responding to the paging according to embodiments of the disclosure, which is not described in detail in embodiments of the disclosure.

Figure 13:
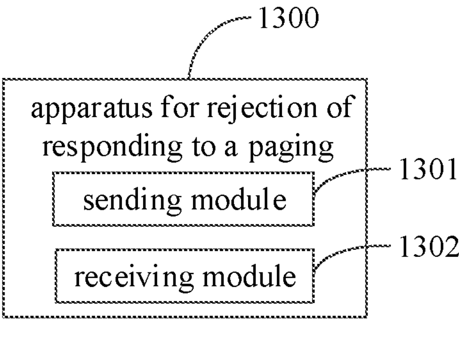
FIG. 13 is a block diagram illustrating an apparatus for rejection of responding to a paging applied to an access network device according to another embodiment of the disclosure.

FIG. 13 is a block diagram illustrating an apparatus for rejection of responding to a paging according to another embodiment of the disclosure. The apparatus may be applied to an access network device.

As illustrated in FIG. 13, the apparatus 1300 for rejection of responding to the paging may include a sending module 1301 and a receiving module 1302.

The sending module 1301 is configured to send a paging message to a terminal device.

The receiving module 1302 is configured to receive a service request message sent by the terminal device. The service request message includes a paging reject response identifier.

Alternatively, the paging reject response identifier is configured to indicate a rejection of responding to the paging message.

Alternatively, the apparatus 1300 for rejection of responding to the paging may further include:

a controlling module, configured to control an RRC link for the terminal device to switch from a first RRC state to a second RRC state.

Alternatively, the first RRC state is an RRC inactive state, and the second RRC state is an RRC connected state.

Alternatively, the service request message further includes paging filtering information. The apparatus 1300 for rejection of responding to the paging may further include:

a filtering module, configured to filter the paging message for the terminal device based on the paging filtering information.

Alternatively, the sending module 1301 is further configured to send the service request message to a core network device.

With the apparatus for rejection of responding to the paging for a user device according to embodiments of the disclosure, the access network device sends the paging message to the terminal device and receives the service request message sent by the terminal device, in which the service request message includes the paging reject response identifier. Therefore, the terminal device can send the paging reject response identifier to a network side through the service request message, such that the network side may perform corresponding processing (such as stopping paging the terminal device continuously) based on the paging reject response identifier, to save corresponding resources.

Corresponding to the method for rejection of responding to the paging provided by embodiments according to FIGS. 10 to 11, the disclosure also provides an apparatus for rejection of responding to a paging. Since the apparatus for rejection of responding to the paging according to embodiments of the disclosure corresponds to the method for rejection of responding to the paging provided by embodiments according to FIGS. 10 to 11, the implementation of the method for rejection of responding to the paging is also applicable to the apparatus for rejection of responding to the paging according to embodiments of the disclosure, which is not described in detail in embodiments of the disclosure.

Figure 14:
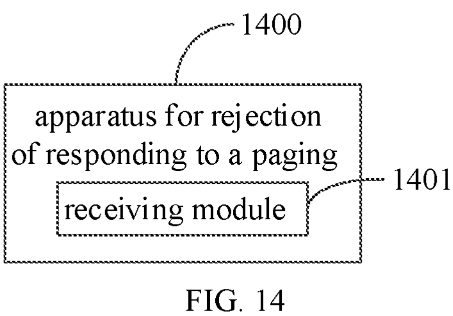
FIG. 14 is a block diagram illustrating an apparatus for rejection of responding to a paging applied to a core network device according to another embodiment of the disclosure.

FIG. 14 is a block diagram illustrating an apparatus for rejection of responding to a paging according to another embodiment of the disclosure. The apparatus may be applied to a core network device.

As illustrated in FIG. 14, the apparatus 1400 for rejection of responding to the paging may include a receiving module 1401.

The receiving module 1401 is configured to receive a service request message sent by an access network device. The service request message includes a paging reject response identifier.

Alternatively, the paging reject response identifier is configured to indicate a rejection of responding to the paging message.

Alternatively, the service request message is generated when the terminal device makes a rejection of responding to the paging message. The service request message further includes paging filtering information. The apparatus 1400 for rejection of responding to the paging may further include:

a filtering module, configured to filter the paging message for the terminal device based on the paging filtering information.

Alternatively, the apparatus 1400 for rejection of responding to the paging may further include:

a processing module, configured to stopping paging the terminal device and to discard cached downlink data based on the paging reject response identifier.

With the apparatus for rejection of responding to the paging for a user device according to embodiments of the disclosure, and the core network device receives the service request message sent by the access network device, in which the service request message includes the paging reject response identifier. Therefore, the paging reject response identifier is sent to a network side through the service request message, such that the network side may perform corresponding processing (such as stopping paging the terminal device continuously) based on the paging reject response identifier, to save corresponding resources.

To achieve the above embodiments, the disclosure provides a communication device. The communication device includes a processor and a memory. The memory has a computer program stored thereon. The apparatus is caused to perform the method according to embodiments of the disclosure described with reference to FIGS. 1 to 5 when the processor executes the computer program stored in the memory. For example, the communication device may be the terminal device in the above embodiments.

To achieve the above embodiments, the disclosure provides another communication device. The communication device includes a processor and a memory. The memory has a computer program stored thereon. The apparatus is caused to perform the method according to embodiments of the disclosure described with reference to FIGS. 7 to 9 when the processor executes the computer program stored in the memory. For example, the communication device may be the access network device in the above embodiments.

To achieve the above embodiments, the disclosure provides another communication device. The communication device includes a processor and a memory. The memory has a computer program stored thereon. The apparatus is caused to perform the method according to embodiments of the disclosure described with reference to FIGS. 10 to 11 when the processor executes the computer program stored in the memory. For example, the communication device may be the core network device in the above embodiments.

To achieve the above embodiments, the disclosure provides a communication apparatus. The communication apparatus includes: a processor and an interface circuit. The interface circuit is configured to receive code instructions and to transmit the code instructions to the processor. The processor is configured to operate the code instructions to perform the method according to embodiments of the disclosure described with reference to FIGS. 1 to 5. For example, the communication apparatus may be the terminal device in the above embodiments.

To achieve the above embodiments, the disclosure provides another communication apparatus. The communication apparatus includes: a processor and an interface circuit. The interface circuit is configured to receive code instructions and to transmit the code instructions to the processor. The processor is configured to operate the code instructions to perform the method according to embodiments of the disclosure described with reference to FIGS. 7 to 9. For example, the communication apparatus may be the access network device in the above embodiments.

To achieve the above embodiments, the disclosure provides another communication apparatus. The communication apparatus includes: a processor and an interface circuit. The interface circuit is configured to receive code instructions and to transmit the code instructions to the processor. The processor is configured to operate the code instructions to perform the method according to embodiments of the disclosure described with reference to FIGS. 10 to 11. For example, the communication apparatus may be the core network device in the above embodiments.

To achieve the above embodiments, the disclosure provides a computer readable storage medium for storing instructions. When the instructions are executed, the method according to embodiments of the disclosure described with reference to FIGS. 1 to 5 is implemented.

To achieve the above embodiments, the disclosure provides another computer readable storage medium for storing instructions. When the instructions are executed, the method according to embodiments of the disclosure described with reference to FIGS. 7 to 9 is implemented.

To achieve the above embodiments, the disclosure provides another computer readable storage medium for storing instructions. The instructions are executed, the method according to embodiments of the disclosure described with reference to FIGS. 10 to 11 is implemented.

Figure 15:
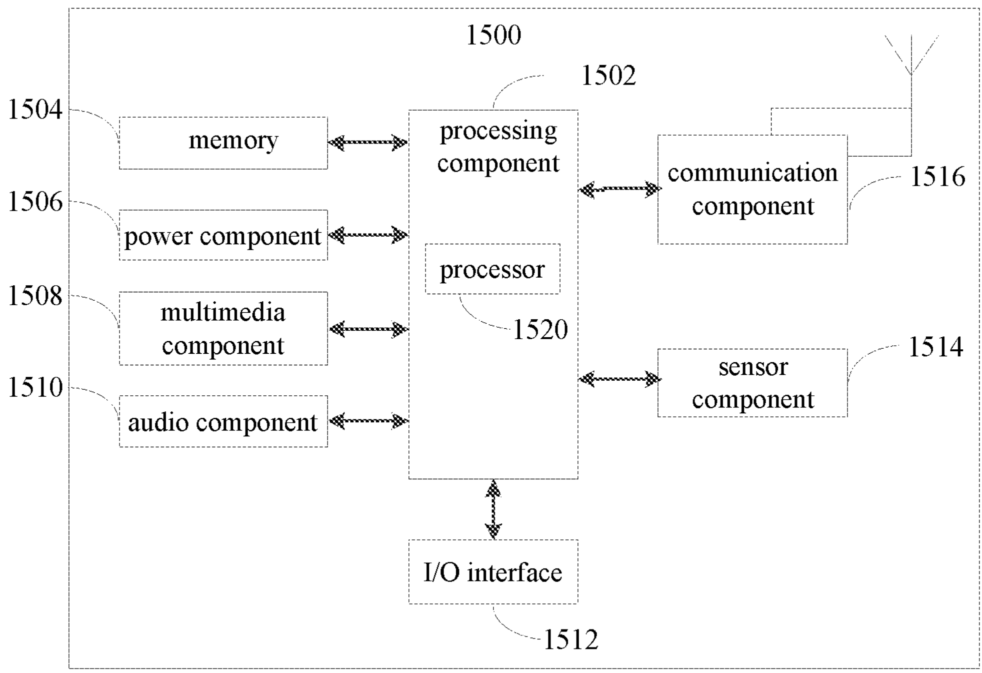
FIG. 15 is a block diagram illustrating a terminal device according to an embodiment of the disclosure.

FIG. 15 is a block diagram illustrating a terminal device according to an embodiment of the disclosure. For example, the terminal device 1500 may be a mobile phone, a computer, a digital broadcast user device, a messaging sending and receiving equipment, a game console, a tablet, a medical device, a fitness device, a personal digital assistant, or the like.

As illustrated in FIG. 15, the terminal device 1500 may include one or more of: a processing component 1502, a memory 1504, a power component 1506, a multimedia component 1508, an audio component 1510, an input/output (I/O) interface 1512, a sensor component 1514, and a communication component 1516.

The processing component 1502 typically controls overall operations of the terminal device 1500, such as the operations associated with display, telephone calls, data communications, camera operations, and recording operations. The processing component 1502 may include one or more processors 1520 to execute instructions to perform all or part of the steps in the above described methods. Moreover, the processing component 1502 may include one or more modules (not shown) which facilitate the interaction between the processing component 1502 and other components. For example, the processing component 1502 may include a multimedia module to facilitate the interaction between the multimedia component 1508 and the processing component 1502.

The memory 1504 is configured to store various types of data to support the operation of the terminal device 1500. Examples of such data include instructions for any applications or methods operated on the terminal device 1500 for performing contraction data, phonebook data, messages, pictures, video, etc. The memory 1504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 is configured to provide power to various components of the terminal device 1500. The power component 1506 may include a power management system, at least one power source, and any other components associated with the generation, management, and distribution of power in the terminal device 1500.

The multimedia component 1508 includes a screen providing an output interface between the terminal device 1500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1508 includes a front camera and/or a rear camera. The front camera and the rear camera may receive an external multimedia datum while the terminal device 1500 is in an operation mode, such as a photographing mode or a video mode. Each of the front camera and the rear camera may be a fixed optical lens system or have focus and optical zoom capability.

The audio component 1510 is configured to output and/or input audio signals. For example, the audio component 1510 includes a microphone ("MIC") for receiving an external audio signal when the terminal device 1500 is in an operation mode, such as a call mode, a recording mode, and a speech recognition mode. The received audio signal may be further stored in the memory 1504 or transmitted via the communication component 1516. In some embodiments, the audio component 1510 further includes a speaker to output audio signals.

The I/O interface 1512 is configured to provide an interface between the processing component 1502 and peripheral interface modules, such as a keyboard, a click wheel, buttons, and the like. The buttons may include, but be not limited to, a home button, a volume button, a starting button, and a locking button.

The sensor component 1514 includes at least one sensor for providing status assessments of various aspects of the terminal device 1500. For example, the sensor component 1514 may detect an open/closed status of the terminal device 1500, relative positioning of components, e.g., the display and the keypad of the terminal device 1500, a change in position of the terminal device 1500 or a component of the terminal device 1500, a presence or absence of user contraction with the terminal device 1500, an orientation or an acceleration/deceleration of the terminal device 1500, and a change in temperature of the terminal device 1500. The sensor component 1514 may include a proximity sensor for detecting the presence of nearby objects without any physical contact. The sensor component 1514 may also include a light sensor, such as a CMOS (complementary metal-oxide-semiconductor)) or a CCD (charge coupled device) image sensor, for use in imaging applications. In some embodiments, the sensor component 1514 may also include an accelerometer sensor, a gyroscope sensor, a magnetic sensor, a pressure sensor, or a temperature sensor.

The communication component 1516 is configured to facilitate communication, wired or wirelessly, between the terminal device 1500 and other devices. The terminal device 1500 may access a wireless network based on a communication standard, such as Wi-Fi, 2G, or 3G, or a combination thereof. In an exemplary embodiment, the communication component 1516 receives a broadcast signal or broadcast associated information from an external broadcast management system via a broadcast channel. In an exemplary embodiment, the communication component 1516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary embodiments, the terminal device 1500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing any of the above methods described with reference to FIGS. 1 to 5.

In an exemplary embodiment, there is also provided a non-transitory computer readable storage medium including instructions, such as the memory 1504 including the instructions. The instructions may be executed by the processor 1520 in the terminal device 1500 for performing any of the above methods described with reference to FIGS. 1 to 5. For example, the non-transitory computer readable storage medium may be a ROM, a RAM, a CD-ROM, a magnetic tape, a floppy disc, an optical data storage device, and the like.

Figure 16:
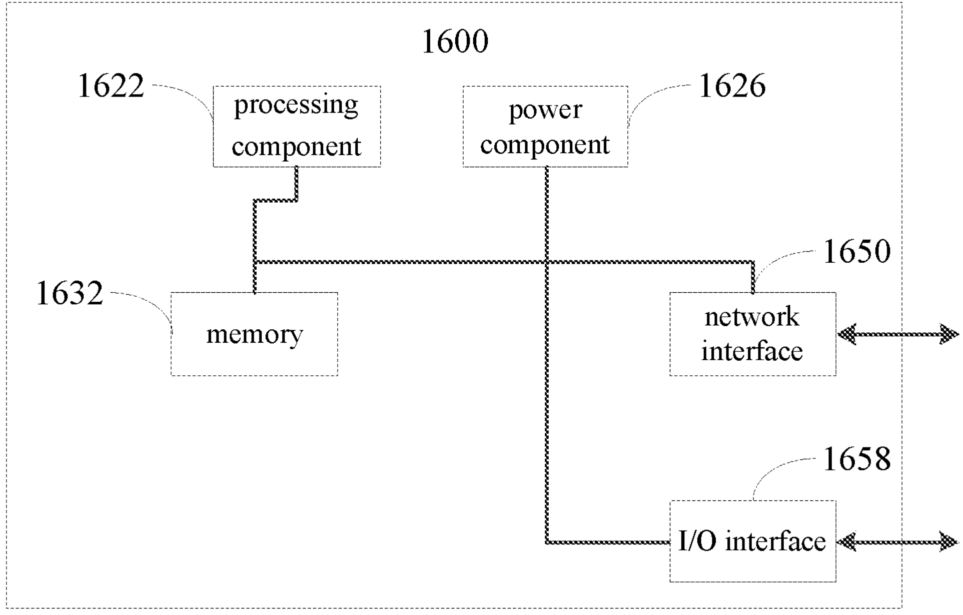
FIG. 16 is a block diagram illustrating a network-side device according to an embodiment of the disclosure.

FIG. 16 is a block diagram illustrating a network-side device according to an embodiments of the disclosure. The network-side device may include an access network device and a core network device. Referring to FIG. 16, the network-side device 1600 includes a processing component 1622, further including one or more processors, and memory resources represented by a memory 1632 for storing instructions, such as application programs, executable by the processing component 1622. The application program stored in the memory 1632 may include one or more modules each corresponding to a set of instructions. In addition, the processing component 1622 is configured to execute instructions to execute any of the above method applied to the network-side device, such as any of the methods illustrated in FIGS. 7 to 11.

The network-side device 1600 may also include a power component 1626 configured to perform power management of the network-side device 1600, a wired or wireless network interface 1650 configured to connect the network-side device 1600 to a network, and an input/output (I/O) interface 1658. The network-side device 1600 may operate an operating system stored in the memory 1632, such as a Windows Server™, a Mac OS X™, a Unix™, a Linux™, a FreeBSD™ or the like.

Other embodiments of the present disclosure may be available to those skilled in the art upon consideration of the specification and practice of the present disclosure herein. The present disclosure is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

It should be understood that the present disclosure is not limited to the precise constructions described above and shown in the enclosed drawings, and various modifications and changes may be made without departing from the scope thereof. The scope of the present disclosure can be limited only by the appended claims.

To achieve the above embodiments, embodiments of the disclosure also provide a communication apparatus. The communication apparatus may be a network-side device, or may be a terminal device, or may be a chip, a chip system or a processor that supports the network-side device (including an access network device and a core network device) to realize the above methods, or may be a chip, a chip system, or a processor that supports the terminal device to realize the above methods. The apparatus may be configured to implement the method described in any of the above method embodiments. For details, please refer to the description in the above method embodiments.

The communication apparatus may include one or more processors. The processor may be a general-purpose processor or a special-purpose processor, etc., such as, a baseband processor or a central processor. The baseband processor may be configured to process communication protocols and communication data. The central processor may be configured to control the communication apparatus (such as, a base station, a baseband chip, a terminal device, a terminal device chip, DU or CU, etc.), to execute the computer programs and process data in the computer programs.

Alternatively, the communication apparatus may further include one or more memories having the computer programs stored thereon. The processor is configured to execute the computer program to cause the communication apparatus to perform the method described in the above method embodiments. Alternatively, the memory may also have data stored thereon. The communication apparatus and the memory may be set separately or integrated together.

Alternatively, the communication apparatus may further include a transceiver and an antenna. The transceiver may be called a transceiver unit, a transceiver, or a transceiver circuit, etc., for implementing a transceiver function. The transceiver may include a receiver and a transmitter. The receiver may be called a receiver or a receiving circuit, etc., for implementing a receiving function. The transmitter may be called a transmitter or a transmitting circuit, etc., for implementing a transmitting function.

Alternatively, the communication apparatus may further include one or more interface circuits. The interface circuit is configured to receive code instructions and to transmit the code instructions to the processor. The processor is configured to operate the code instructions to cause the communication apparatus to perform the method described in any of the above method embodiments.

In an implementation, the processor may include a transceiver for implementing the receiving function and the transmitting function. For example, the transceiver may be a transceiver circuit, an interface, or an interface circuit. The transceiver circuit, the interface or the interface circuit for implementing the receiving function and the transceiver circuit, the interface or the interface circuit for implementing the transmitting function may be separated or integrated together. The transceiver circuit, the interface or the interface circuit may be configured to read and write codes/data, or the transceiver circuit, the interface or the interface circuit may be configured to transmit or transfer signals.

In an implementation, the processor may store a computer program, and the computer program running on the processor may cause the communication apparatus to perform the method described in any of the above method embodiments. The computer program may be solidified in the processor, in this case, the processor may be implemented by hardware.

In an implementation, the communication apparatus may include a circuit. The circuit may implement a sending, receiving or communicating function in the above method embodiments. The processor and the transceiver described in the disclosure may be implemented in an integrated circuit (IC), an analog IC, a radio frequency integrated circuit (RFIC), a mixed-signal IC, an application specific integrated circuit (ASIC), a printed circuit board (PCB), an electronic device, etc. The processor and the transceiver may also be manufactured by various IC process technologies, such as a complementary metal oxide semiconductor (CMOS), a nMetal-Oxide-Semiconductor (NMOS), a positive channel metal oxide semiconductor (PMOS), a bipolar junction transistor (BJT), a bipolar CMOS (BiCMOS), silicon germanium (SiGe), gallium arsenide (GaAs), etc.

The communication apparatus described in the above embodiments may be a network-side device or a terminal device, but the scope for the communication apparatus described in the disclosure is not limited thereto. The communication apparatus may be a stand-alone device or may be a part of a larger device. For example, the communication apparatus may be:

(1) an independent integrated circuit IC, a chip, a chip system or a subsystem;
(2) a set with one or more ICs, alternatively, the set of ICs further including storage components for storing data and computer programs;
(3) an ASIC, such as a modem;
(4) a module that may be embedded in another device;
(5) a receiver, a terminal device, an intelligent terminal device, a cellular phone, a wireless device, a handset, a mobile unit, a vehicle-mounted device, a network-side device, a cloud device, an artificial intelligence device, etc.
(6) other devices and so on.

In the case that the communication apparatus is the chip or the chip system, the chip may include a processor and an interface. There may be one or more processors, and multiple interfaces.

Alternatively, the chip further includes a memory for storing necessary computer programs and data.

The skilled in the art may also understand that various illustrative logical block and steps listed in embodiments of this disclosure may be implemented by electronic hardware, computer software, or a combination of both. Whether such function is implemented by hardware or software depends on a specific application and a design requirement of the whole system. The skilled in the art may employ various methods to implement the described functions for each specific application, but the implementation should not be understood as beyond the protection scope of embodiments of the disclosure.

The disclosure also provides a readable storage medium having instructions stored thereon. The instructions are executed by a computer to implement the functions of any of the above method embodiments.

The disclosure also provides a computer program product. The computer program product is executed by a computer to implement the functions of any of the above method embodiments.

In the above embodiments, it may be implemented in whole or in part in software, hardware, firmware or any combination thereof. When implemented in software, it may be fully or partially implemented in the form of the computer program product. The computer program product includes one or more computer programs. When the computer program is loaded and executed on the computer, the flow or function according to embodiments of the disclosure is generated in whole or in part. The computer may be a general-purpose computer, a special-purpose computer, a computer network, or other programmable devices. The computer program may be stored in the computer-readable storage medium or transmitted from one computer-readable storage medium to another. For example, the computer program may be transmitted from a website, a computer, a server or a data center to another website, computer or data center in a wired (such as a coaxial cable, an optical fiber, a digital subscriber line (DSL)) or wireless (such as infrared, wireless, microwave, etc.). The computer-readable storage medium may be any available medium that the computer may store or a data storage device such as the server, the data center and the like that includes one or more available media integration. The usable medium may be a magnetic medium (e.g., a floppy disk, a hard disk, or a magnetic tape), an optical medium (e.g., a digital video disc (DVD)), or a semiconductor medium (e.g., a solid state disk (SSD)) and the like.

It may be understood by the skilled in the art that, numerical numbers such as first, second and the like involved in the disclosure are only for the convenience of description, and are not used to limit the scope of embodiments of this disclosure, but also indicate the order.

The term "at least one" in the disclosure may also be described as one or more, and the term "multiple" may be two, three, four or more, and the disclosure is not limited thereto. In embodiments of the disclosure, for a technical feature, features in the technical feature are distinguished by the terms "first", "second", "third", "A", "B", "C", "D" and the like. The features described by the terms "first", "second", "third", "A", "B", "C", "D" and the like are in no order or in no size order.

A correspondence illustrated in each table in the disclosure may be configured or predefined. A value of information in each table is only an example, and may be configured as other value, which is not limited in the disclosure. When a correspondence between a piece of information and a parameter is configured, it is not necessary that all the correspondences indicated in each table are configured. For example, a correspondence illustrated by a certain row may not be configured in the table in the disclosure. For another example, an appropriate deformation adjustment may be made based on the above table, such as splitting, merging and the like. A name of the parameter indicated by a heading in the above table may also be other name that may be understood by the communication apparatus. The value or representation of the parameter may also be other value or representation that may be understood by the communication apparatus. Other data structure may also be employed when the above table is implemented, such as an array, a queue, a container, a stack, a linear table, a pointer, a linked list, a tree, a graph, a structure, a class, a heap, a hash table, etc.

Pre-definition in the disclosure may be understood as definition, pre-definition, storage, pre-storage, pre-negotiation, pre-configuration, curing, or pre-firing.

The skilled in the art may realize that units and algorithm steps of various examples described in connection with embodiments disclosed herein may be implemented in electronic hardware, or a combination of computer software and the electronic hardware. Whether these functions are implemented in hardware or software depends on the specific application and design constraints of the technical solution. Skilled people may implement the described functions of each specific application by employing different methods, but such implementation should not be considered beyond the scope of the disclosure.

It may be clearly understood by the skilled in the art that, for the convenience and conciseness of description, specific working processes of the system, the apparatus and the unit described above may refer to the corresponding processes in the above method embodiments, which are not be repeated here.

The above is only the specific implementation of the disclosure, but the protection scope of the disclosure is not limited to this. Any technical person familiar with the technical field may easily think of changes or substitutions within the technical scope disclosed in the disclosure, which should be included in the protection scope of this disclosure. Therefore, the protection scope of the disclosure should be based on the protection scope of the claims.

The invention claimed is:

1. A method for responding to a paging with a rejection, executed by a terminal device, wherein the terminal device has a first communication card and a second communication card, and the method comprises:

receiving, by the second communication card in a radio resource control (RRC) inactive state, a paging message sent by an access network device;

determining, by the second communication card, whether to make a rejection of responding to the paging message based on a service state of the first communication card and a paging reason, wherein the paging reason is comprised in the paging message;

switching the second communication card from the RRC inactive state to an RRC connected state; and sending, by the second communication card in the RRC connected state, a service request message to the access network device, wherein the service request message is sent by the access network device to a core network device, the service request message comprises a paging reject response identifier and paging filtering information, wherein the paging reject response identifier is configured to indicate a rejection of responding to the paging message, and the paging filtering information is configured to filter the paging message for the terminal device; the paging reject response identifier is used for the core network device to stop paging the terminal device and discard cached downlink data.

2. A terminal device, comprising:

a transceiver;

a memory; and a processor, connected to the transceiver and the memory respectively, and configured to control the transceiver to receive and transmit wireless signals and implement the method for responding to the paging with a rejection according to claim 1 by executing computer-executable instructions in the memory.

3. The method of claim 1, wherein the paging reason comprises one or more of a speech type paging, a data service download paging, or a system group messaging paging.

4. The method of claim 1, wherein determining whether to make the rejection of responding to the paging message based on the service state of the first communication card and the paging reason comprises:

determining to make the rejection of responding to the paging message in a case that the service state of the first communication card is a service with a high service level and the paging reason is a service with a low service level.

5. The method of claim 1, wherein determining whether to make the rejection of responding to the paging message based on the service state of the first communication card and the paging reason comprises:

determining not to make the rejection of responding to the paging message in a case that the service state of the first communication card is a service with a low service level and the paging reason is a service with a high service level.

6. The method of claim 1, wherein the paging filtering information comprises a filtering rule, the filtering rule is sent by the core network device to a network element entity, and the network element entity screens and filters downlink data for the terminal device based on the filtering rule.

7. A method for responding to a paging with a rejection, executed by an access network device, comprising:

sending a paging message to a terminal device, wherein the terminal device has a first communication card and a second communication card, and the second communication card determines whether to make a rejection of responding to the paging message based on a service state of the first communication card and a paging reason, wherein the paging reason is comprised in the paging message;

receiving a service request message sent by the second communication card of the terminal device, wherein the service request message is sent by the terminal device in a radio resource control (RRC) connected state after switching from an RRC inactive state to the RRC connected state, the service request message comprises a paging reject response identifier and paging filtering information, wherein the paging reject response identifier is configured to indicate a rejection of responding to the paging message, and the paging filtering information is configured to filter the paging message for the terminal device; and sending the service request message to a core network device, wherein the core network device stops paging the terminal device and discards cached downlink data based on the paging reject response identifier.

8. The method of claim 7, after sending the paging message to the terminal device, further comprising:

controlling an RRC link for the terminal device to switch from the RRC inactive state to the RRC connected state.

9. An access network device, comprising:

a transceiver;

a memory; and a processor, connected to the transceiver and the memory respectively, and configured to control the transceiver to receive and transmit wireless signals and implement the method for responding to the paging with a rejection according to claim 7 by executing computer-executable instructions in the memory.

10. The method of claim 7, wherein the paging reason comprises one or more of a speech type paging, a data service download paging, or a system group messaging paging.

11. The method of claim 7, wherein the second communication card determines whether to make the rejection of responding to the paging message based on the service state of the first communication card and the paging reason by:

determining to make the rejection of responding to the paging message in a case that the service state of the first communication card is a service with a high service level and the paging reason is a service with a low service level.

12. The method of claim 7, wherein the second communication card determines whether to make the rejection of responding to the paging message based on the service state of the first communication card and the paging reason by:

determining not to make the rejection of responding to the paging message in a case that the service state of the first communication card is a service with a low service level and the paging reason is a service with a high service level.

13. The method of claim 7, wherein the paging filtering information comprises a filtering rule, the filtering rule is sent by the core network device to a network element entity, and the network element entity screens and filters downlink data for the terminal device based on the filtering rule.

14. A method for responding to a paging with a rejection, executed by a core network device, comprising:

receiving a service request message sent by an access network device, wherein the service request message is sent by a second communication card of a terminal device in a radio resource control (RRC) connected state after switching from an RRC inactive state to the RRC connected state, the service request message comprises a paging reject response identifier and paging filtering information, wherein the paging reject response identifier is configured to indicate a rejection of responding to a paging message, and the paging filtering information is configured to filter the paging message for the terminal device;

stopping paging the terminal device and discarding cached downlink data based on the paging reject response identifier;

wherein the terminal device has a first communication card and the second communication card, the paging message is sent by the access network device to the second communication card, and the service request message is sent by the second communication card in a case of determining to make a rejection of responding to the paging message based on a service state of the first communication card and a paging reason, wherein the paging reason is comprised in the paging message.

15. A core network device, comprising:

a transceiver;

a memory; and a processor, connected to the transceiver and the memory respectively, and configured to control the transceiver to receive and transmit wireless signals and implement the method for responding to the paging with a rejection according to claim 14 by executing computer-executable instructions in the memory.

16. The method of claim 14, wherein the paging reason comprises one or more of a speech type paging, a data service download paging, or a system group messaging paging.

17. The method of claim 14, wherein the second communication card determines to make the rejection of responding to the paging message in a case that the service state of the first communication card is a service with a high service level and the paging reason is a service with a low service level.

18. The method of claim 14, wherein the second communication card determines not to make the rejection of responding to the paging message in a case that the service state of the first communication card is a service with a low service level and the paging reason is a service with a high service level.

19. The method of claim 14, wherein the paging filtering information comprises a filtering rule, the filtering rule is sent by the core network device to a network element entity, and the network element entity screens and filters downlink data for the terminal device based on the filtering rule.

* * * * *